UNITED STATES PATENT OFFICE.

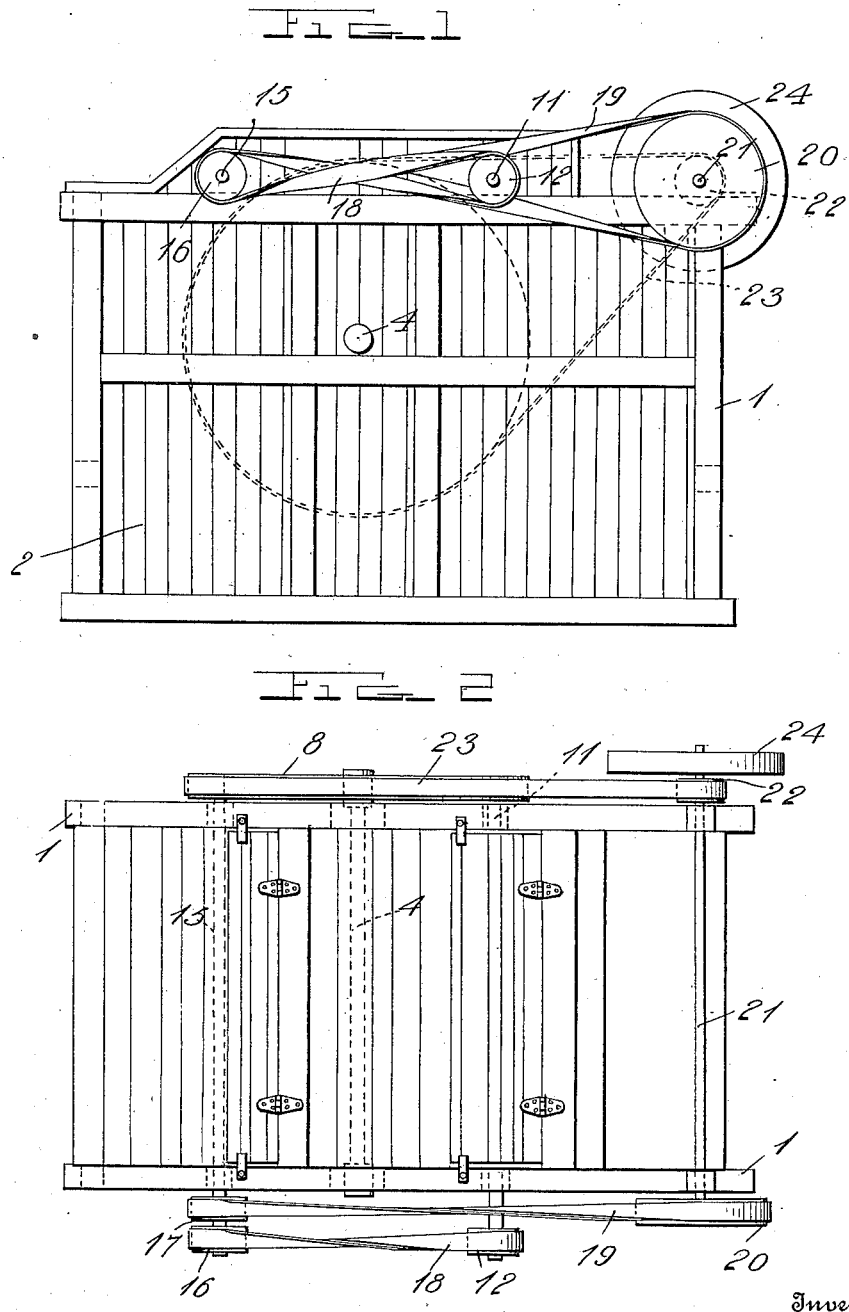

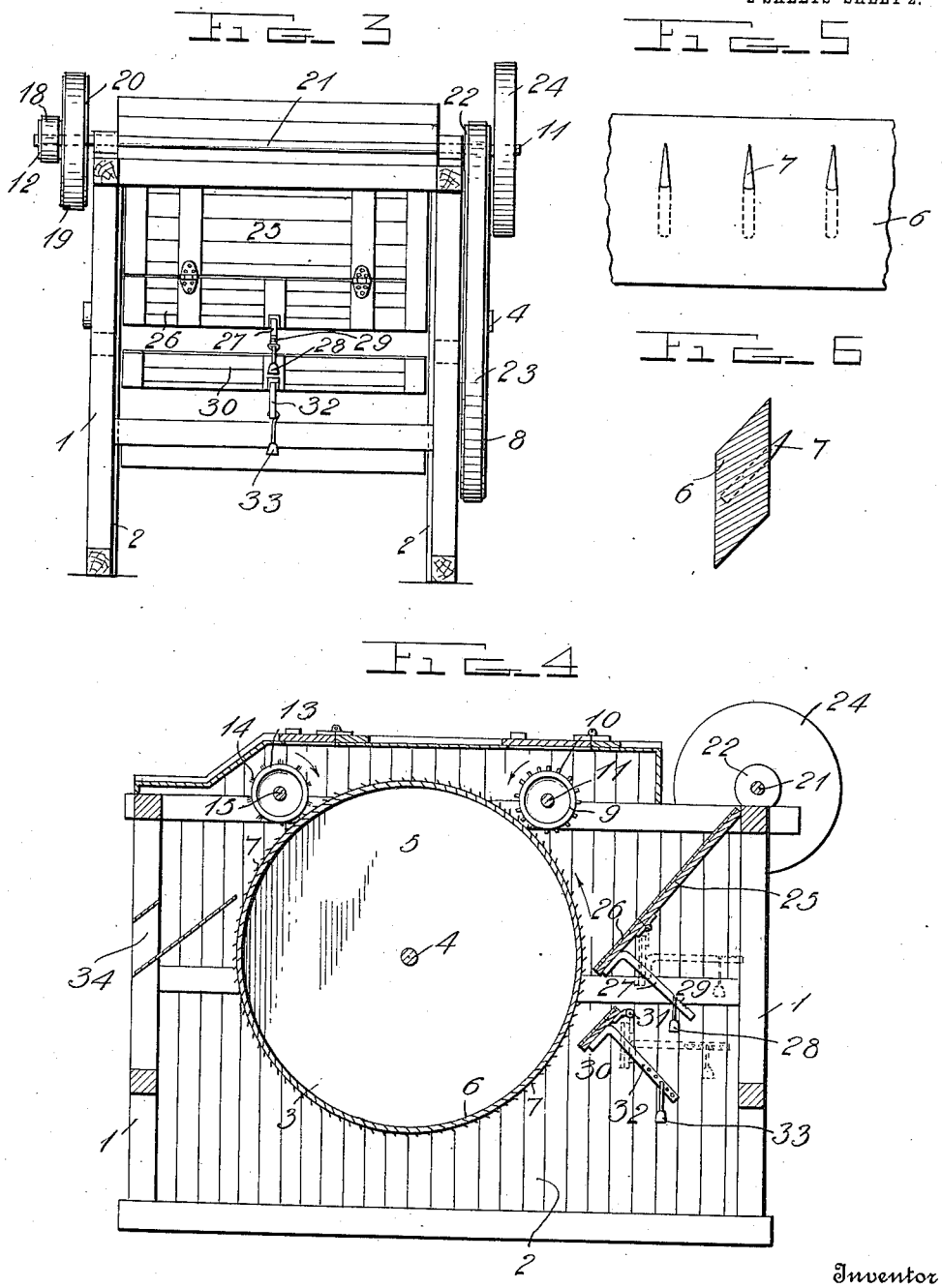

CHARLES AUGUST BRUST, OF MEMPHIS, TENNESSEE.

COTTON-SEPARATING MACHINE.

1,093,106.  Specification of Letters Patent.  Patented Apr. 14, 1914.

Application filed July 29, 1912.  Serial No. 712,155.

*To all whom it may concern:*

Be it known that I, CHARLES A. BRUST, a citizen of the United States, residing at Memphis, in the county of Shelby and State of Tennessee, have invented certain new and useful Improvements in Cotton-Separating Machines; and I do declare the following to be a full, clear, and exact description of the invention, such as will enable others skilled in the art to which it appertains to make and use the same.

This invention relates to improvements in cotton separating machines.

One object of the invention is to provide a machine of this character by means of which tufts or locks of cotton remaining with the seed and bolls after the ginning operation may be separated from the seed and bolls and saved.

A further object is to provide a separating machine of the character described which will be simple and inexpensive in construction, efficient in operation and well adapted to the purpose for which it is designed.

With these and other objects in view, the invention consists of certain novel features of construction, combination and arrangement of parts, as will be hereinafter described and claimed.

In the accompanying drawings:—Figure 1 is a side view of my improved cotton separating machine; Fig. 2 is a top plan view thereof; Fig. 3 is a rear end view; Fig. 4 is a vertical longitudinal section; Fig. 5 is a detail side view of a portion of one of the slats of the spiked cotton carrying drum; and Fig. 6 is a cross sectional view of the same.

My improved cotton separating machine comprises a frame 1, the sides of which are preferably boarded up or closed as at 2.

Revolubly-mounted in the center of the frame is a cotton conveying drum 3 comprising a shaft 4 having fixed thereon circular heads 5, to which are secured series of spike supporting slats 6, said slats having their engaging edges beveled or formed on a suitable angle to permit the slats to be closely fitted around the heads of the drums, as shown. In each of the slats 6 is a row of pointed angularly-disposed spikes 7, the points of which project outwardly from the outer sides of the flap, as shown. The shaft 4 of the drum is revolubly mounted in suitable bearings in the sides of the frame 1, and has fixed on one end a driving pulley 8, whereby the drum is operated in the manner hereinafter described.

Revolubly mounted in the upper portion of the frame 1 above and adjacent to one side of the drum 3 is a knocker roll 9, in which are arranged series of radially-projecting pins 10, said pins being arranged in rows across the roll, the pins of one row being disposed opposite the center of the spaces between the pins of the adjoining row, as shown. The shaft 11 of the knocker roll is revolubly-mounted in suitable bearings on the upper portion of the frame and on one end of said shaft is fixed a drive pulley 12.

In the upper portion of the frame above and adjacent to the opposite side of the drum 3 from the roll 9 is revolubly mounted a brushing roll or drum 13, on which are arranged rows of brushes 14, which coact with the spike drum 3 for removing therefrom the locks of cotton, as will be hereinafter described. The shaft 15 of the roll 13 is revolubly mounted in suitable bearings on the frame 1 and has fixed on one end drive pulleys 16 and 17. The pulley 16 is connected by a crossed belt 18 with the pulley 12 on the shaft of the knocker roll, whereby said knocker roll is driven in the proper direction. The pulley 17 on the shaft 15 of the brushing roll is connected by a crossed belt 19 to a pulley 20 on a main drive shaft 21, which is revolubly mounted in suitable bearings on the frame 1 adjacent to one end thereof, as shown. On the opposite end of the main drive shaft 21 is fixed a drive pulley 22, which is connected by a drive belt 23 with the pulley 8 on the shaft 4 of the cotton conveying drum 3, whereby the latter is driven in the proper direction. On one end of the main drive shaft 21 is also fixedly mounted a main drive pulley 24, whereby said shaft is driven by any suitable power.

Arranged in the front end of the frame 1 is a hull board 25 in the form of an inclined board or plate, the lower end of which is separated from and hingedly connected to the main portion of the plate and forms a door 26. The door 26 is yieldingly held in place by a lever 27 secured to the rear side thereof and having a weight 28 which is adapted to be adjustably connected to the end of the lever in a series of notches 29 formed therein, as shown. When thus arranged the lever 27 and weight 28 will swing and yieldingly hold the door 26 in an operative position. Below the board 25 and spaced a suitable distance from the lower end thereof is a second or supplemental hull board 30 in the form of a plate hingedly connected at its upper edge to a supporting rod 31 and having secured to its underside a rightangularly-projecting lever 32 provided with a series of apertures with which are adapted to be adjustably engaged a weight 33, whereby the board 30 is yieldingly held in operative position to coact with the cotton conveying drum 3 for a purpose hereinafter described. In the rear end of the frame below the brushing drum or roll 13 is arranged a discharge chute 34 by means of which the separated locks of cotton are removed from the machine.

In picking cotton there are always more or less cotton bolls picked with the cotton and in the ginning operation these bolls as well as some locks of cotton pass through the ginning machine with the cotton seeds. The seeds are generally shipped in this condition to the oil mills. This machine is designed to separate or remove the tufts or locks of cotton from the seed and bolls, thus saving the cotton which would otherwise be wasted. This saving of this cotton amounts to quite an item in a season's run.

In the operation of the machine, the seed, bolls and locks of cotton are fed into the main hull board 25. The locks of cotton are caught by the spikes of the drum 5 and are carried up out of the hopper and are brushed from the spikes of the drum by the brushing roll 13. The tufts or locks of cotton when thus removed from the drum 5 fall into the chute 34 and are conducted thereby to a receptacle provided to receive the same. In this separating operation the cotton bolls are frequently caught by the spikes of the drum and carried up thereby but are prevented from being carried around with the drum by the knocker roll, the pins of which strike the bolls and knock the same off from the spikes of the drum 5, causing the bolls to fall back into the board 25 and to finally pass therefrom into the lower board 30, from which they are discharged from the machine. The second or lower board 30 is provided to catch any locks of cotton which may casually fall from the upper board 25, said locks being caught by the teeth of the drum and carried up from this board in the manner described. By providing the upper board with a hinged yieldingly supported door and by pivotally and yieldingly supporting the lower board, the boards may be readily cleaned out or opened to permit stones or other foreign matter to be discharged therefrom.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim, is:—

The combination with the opposite side walls of the frame of a cotton separating machine, of a conveyer drum mounted transversely between said walls, a knocker and a brushing roll mounted to engage with said conveyer drum, an inclined hull board arranged in the front of the frame and leading from the receiving end of the latter, a door hinged to the lower edge of the hull board for alinement with the latter, a weighted lever secured to said door for yieldingly holding the same in operative position, a supplemental hull board hingedly mounted below the first named hull board, and also provided with a weighted lever to hold the same at the proper inclination in respect to the door forming a part of the first named hull board, whereby said hull boards are yieldingly held in position, and means to operatively connect the conveyer drum and rolls, whereby the same are driven in the proper direction.

In testimony whereof I have hereunto set my hand in presence of two subscribing witnesses.

CHARLES AUGUST BRUST.

Witnesses:
W. E. BOOTHE,
J. D. McGILL.

---

Copies of this patent may be obtained for five cents each, by addressing the "Commissioner of Patents, Washington, D. C."